United States Patent [19]

Yamashita et al.

[11] Patent Number: 5,060,768

[45] Date of Patent: Oct. 29, 1991

[54] CREEP CONTROL FOR A CONTINUOUSLY VARIABLE TRANSMISSION

[75] Inventors: Yoshinori Yamashita; Sadayuki Hirano; Katsuaki Murano, all of Shizuoka; Takumi Tatsumi; Hiroaki Yamamoto, both of Hyogo, all of Japan

[73] Assignees: Suzuki Jidosha Kogyo Kabushiki Kaisha, Japan; Mitsubishi Denki Kabushiki Kaisha, Japan

[21] Appl. No.: 443,719

[22] Filed: Nov. 29, 1989

[30] Foreign Application Priority Data

Nov. 30, 1988 [JP] Japan .................. 63-302730

[51] Int. Cl.⁵ .................. F16H 59/18; F16H 9/20; G06F 15/50
[52] U.S. Cl. .................. 192/0.052; 192/3.58; 74/866; 364/424; 474/28
[58] Field of Search ............... 474/18, 28, 17; 74/866, 74/867; 192/4 C, 0.052, 3.58

[56] References Cited

U.S. PATENT DOCUMENTS

| 4,457,411 | 7/1984 | Hirmatsu | 192/0.076 |
|---|---|---|---|
| 4,458,318 | 7/1984 | Smit et al. | 364/424.1 |
| 4,475,416 | 10/1984 | Underwood | 74/868 |
| 4,665,773 | 5/1987 | Hiramatsu | 74/866 |
| 4,718,308 | 1/1988 | Haley | 74/866 |
| 4,766,544 | 8/1988 | Kurihara et al. | 364/424.1 |
| 4,768,636 | 9/1988 | Ito et al. | 192/3.58 X |
| 4,798,561 | 1/1989 | Hattori et al. | 474/28 |
| 4,811,225 | 3/1989 | Petzold et al. | 364/424.1 |
| 4,850,937 | 7/1989 | Sakai | 474/28 |
| 4,854,433 | 8/1989 | Tellert | 192/0.052 X |
| 4,905,801 | 3/1990 | Tezuka | 364/424.1 X |
| 4,958,538 | 9/1990 | Yamashuta et al. | 74/866 |
| 5,007,512 | 4/1991 | Petzold | 74/866 X |

FOREIGN PATENT DOCUMENTS

| 57-186656 | 11/1982 | Japan . |
|---|---|---|
| 59-43249 | 3/1984 | Japan . |
| 59-77159 | 5/1984 | Japan . |
| 61-233256 | 10/1986 | Japan . |
| 62-134461 | 6/1987 | Japan . |
| 62-134464 | 6/1987 | Japan . |

Primary Examiner—Allan D. Herrmann
Assistant Examiner—Khoi Q. Ta
Attorney, Agent, or Firm—Flynn, Thiel, Boutell & Tanis

[57] ABSTRACT

A continuously variable transmission has a fixed pulley piece and has a movable pulley piece which is supported for movement toward and away from the fixed pulley piece, the width of a groove between the pulley pieces being increased or decreased in order to increase or decrease the radius of rotation of a belt looped around a driving side pulley and a driven side pulley which include the fixed and movable pulley pieces to thereby vary a belt ratio. A hydraulic clutch is engaged and disengaged under control of a clutch pressure in order to vary a driving force output by the continuously variable transmission, and a control arrangement controls and hydraulic clutch so that creep caused by slippage of the hydraulic clutch in a hold mode during a reverse gear operation of the continuously variable transmission is larger than creep caused by slippage of the hydraulic clutch in a hold mode during forward gear operation of the continuously variable transmission.

5 Claims, 4 Drawing Sheets

CREEP CONTROL FOR A CONTINUOUSLY VARIABLE TRANSMISSION

FIELD OF THE INVENTION

This invention relates to a creep control arrangement for a continuously variable transmission and, more particularly, to a creep control arrangement for a continuously variable transmission capable of improving driving performance during reverse gear operation of the continuously variable transmission without jeopardizing driving performance during forward gear operation of the continuously variable transmission.

BACKGROUND OF THE INVENTION

In a vehicle such as an automobile, a transmission is disposed between an internal combustion engine and a driving wheel. The transmission varies a driving force transmitted to the driving wheel from the internal combustion engine and a traveling speed in a manner to meet with traveling conditions of the vehicle which vary in a wide range, so that the internal combustion engine can exhibit satisfactory performance. There are several types of transmissions, for example a gear type transmission in which a driving force is transmitted by changing the gear ratio in steps by means of selectively switching the meshing state of a multistage gear train, and for example a continuously variable transmission having a fixed pulley piece and having a movable pulley piece which is supported for movement toward and away from the fixed pulley, the width of a groove between the pulley pieces being increased or decreased in order to increase or decrease the radius of rotation of a belt looped around a driving side pulley and a driven side pulley which include the fixed and movable pulley pieces to thereby continuously vary a gear ratio to transmit a driving force. Such a continuously variable transmission is disclosed, for example, in Japanese Patent Early Laid-open publication No. Sho 57-186656, Japanese Patent Early Laid-open Publication No. Sho 59-43249, Japanese Patent Early Laid-open Publication No. Sho 59-77159, and Japanese Patent Early Laid-open Publication No. Sho 61-233256.

As a continuously variable transmission which varies the belt ratio by hydraulic pressure, one is known which is provided with a hydraulic clutch which is engaged and disengaged by clutch pressure in order to adjust a driving force output by this continuously variable transmission. This continuously variable transmission, even when a vehicle is stopped, in the case where the gear is for example shifted into a forward position, effects such a degree of clutch control pressure as is just enough to cause the hydraulic clutch slightly engaged in its hold mode in order to cause the sliding hydraulic clutch to transmit a very weak driving force to thereby generate a small amount of creep. Owing to this creep, starting on a slope is facilitated.

If this creep is large, the vehicle moves when the vehicle is stopped to wait for a traffic signal or the like in a state where the gear is shifted to its forward position. Therefore, it is necessary to perform an operation such as pressing a foot brake down hard, actuating a side or parking brake, or shifting the gear into its neutral or parking position. Furthermore, if the creep is large, vibrations tend to occur and driving performance is jeopardized. In view of the foregoing, the clutch pressure was heretofore set so that the creep would become small when the vehicle was running in its normal mode in order not to jeopardize the driving performance when the gear is shifted into its forward position.

However, in the case where that continuously variable transmission was operated in its reverse position, if the creep is small, it is difficult to drive with much care when the vehicle is moving in reverse. As far as driving performance is concerned, the creep should be large. That is, if the creep is small, it becomes difficult to produce reverse movement of the vehicle only by means of creep, and it is necessary to step down on the accelerating pedal in order to move the vehicle backward. Because of the foregoing reason, in the conventional continuously variable transmission, when the accelerating pedal is stepped on in order to effect reverse movement of the vehicle after the gear is shifted into its reverse position, a clutch pressure of the hydraulic clutch is brought into a normal start mode in which it is stronger than in the hold mode, or otherwise it becomes a drive mode clutch pressure. However, it is difficult to adjust the speed to a level that the driver desires when in a normal start mode, and the reverse vehicle speed becomes too fast. Therefore, it is not easy for the driver to drive the vehicle backward.

It is therefore an object of the present invention to provide a creep control for a continuously variable transmission, in which driving performance is improved when the continuously variable transmission is operated in reverse without jeopardizing driving performance when the continuously variable transmission is operated in forward and, moreover, in which this control can be added to a conventional continuously variable transmission with ease.

SUMMARY OF THE INVENTION

In order to achieve this object, there is provided a continuously variable transmission having a fixed pulley piece and having a movable pulley piece which is supported for movement toward and away from the fixed pulley piece, the width of a groove between the pulley pieces being increased or decreased in order to increase or decrease the radius of rotation of a belt looped around a driving side pulley and a driven side pulley which include the fixed and movable pulley pieces to thereby vary a belt ratio. A hydraulic clutch is engaged and disengaged under control of a clutch pressure in order to vary a driving force output by the continuously variable transmission, and a control arrangement controls the hydraulic clutch so that creep caused by slippage of the hydraulic clutch in a hold mode during a reverse gear operation of the continuously variable transmission is larger than creep caused by slippage of the hydraulic clutch in a hold mode during forward gear operation of the continuously variable transmission.

According to the invention, a clutch pressure is controlled so that creep caused by slippage of a hydraulic clutch when the continuously variable transmission is operated in reverse is larger than creep caused by slippage of the hydraulic clutch when the transmission is operated in forward. As a result, a vehicle can utilize a larger creep for reverse operation than for forward operation without the necessity of stepping down on the accelerating pedal.

BRIEF DESCRIPTION OF THE DRAWINGS

The embodiments of the present invention described in detail with reference to the accompanying drawings, in which.

DETAILED DESCRIPTION

Figure 1:
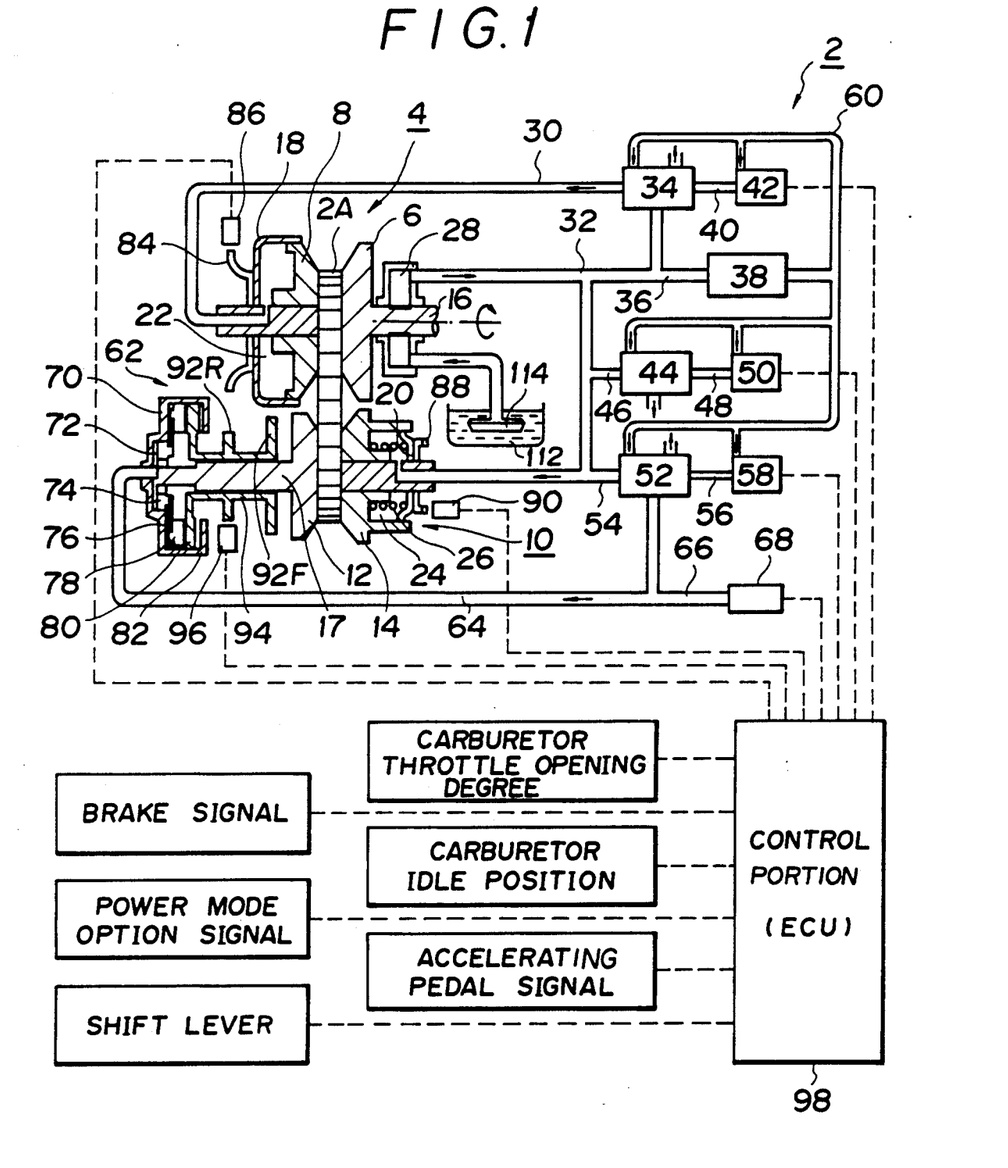
FIG. 1 is a block diagram of a continuously variable transmission embodying the present invention.

In FIG. 1, reference numeral 2 denotes a continuously variable transmission of a belt driving type, 2A a belt, 4 a driving side pulley, 6 a driving side fixed pulley piece, 8 a driving side movable pulley piece, 10 a driven side pulley, 12 a driven side fixed pulley piece, and 14 a driven side movable pulley piece.

The driving side pulley 4 includes a driving side fixed pulley piece 6 fixed to a rotational shaft 16 which is an input shaft, and a driving side movable pulley piece 8 axially movably and nonrotatably supported on the rotational shaft 16. Also, the driven side pulley 10, like the driving side pulley 4, includes a rotational shaft 17 which is an output shaft, a driven side fixed pulley piece 12, and a driven side movable pulley piece 14.

The driving side movable pulley piece 12 and the driven side movable pulley piece 14 are provided with first and second housings 18 and 20, respectively, and formed therein are first and second hydraulic chambers 22 and 24, respectively. A hydraulic pressure receiving area of the driving side movable pulley piece 8 of the first hydraulic chamber 22 is set to be larger than that of the driven side pulley piece 14. By virtue of the foregoing arrangement, a belt ratio serving as a change gear ratio can be varied by controlling hydraulic oil pressure acting in the first hydraulic chamber 22. The driven side second hydraulic chamber 24 has therein an energizing spring 26 for urging the driven side movable pulley 14 in a direction reducing the width of a groove formed between the driven side fixed pulley piece 12 and the driven side movable pulley piece 14. This energizing spring 26 ensures, when the hydraulic pressure is low, such as at starting, that the change gear ratio is set large at the full low side and the holding force of the belt 2A is maintained in order to prevent slippage.

The rotational shaft 16 drives an oil pump 28 which communicates with the first and second hydraulic chambers 22 and 24 through respective first and second oil paths 30 and 32. The first oil path 30 communicates at one end with a primary pressure control valve 34 serving as a change gear control valve for controlling a primary pressure as an input shaft sheave pressure. The second oil path 32 is disposed on the side of the oil pump 28 with respect to this primary pressure control valve 34, and communicates through a third oil path 36 with a constant pressure control valve 38 for controlling the line pressure from path 32 (generally 5 to 25 kg/cm$^2$) to a control hydraulic pressure having a constant pressure (3 to 4 kg/cm$^2$) in a path 60, while the primary pressure control valve 34 communicates with a primary pressure controlling first three-way electromagnetic valve 42 through a fourth oil path 40.

Also, the second oil path 32 communicates at its middle through a fifth oil path 46 with a line pressure control valve 44 having the function of an escape valve for controlling the line pressure as a pump pressure, and this line pressure control valve 44 communicates with a line pressure controlling second three-way electromagnetic valve 50 through a sixth oil path 48.

Furthermore, the second oil path 32 communicates, through a seventh oil path 54 at its middle between the second hydraulic chamber 24 and the line pressure control valve 44, with a clutch pressure control valve 52 for controlling the clutch pressure with hydraulic oil pressure acting on a hydraulic clutch 62, and this clutch pressure control valve 52 communicates with a clutch pressure controlling third three-way electromagnetic valve 58 through an eighth oil path 56.

In order to feed a control hydraulic pressure having a constant pressure taken off from the constant pressure control valve 38 to the primary pressure control valve 34, to the primary pressure controlling first three-way electromagnetic valve 42, to the line pressure control valve 44, to the line pressure controlling second three-way electromagnetic valve 50, the clutch pressure control valve 52, and to the clutch pressure controlling third three-way electromagnetic valve 58, these valves 38, 34, 42, 44, 50, 52 and 58 all communicate with a ninth oil path 60.

The clutch pressure control valve 52 communicates with the clutch hydraulic chamber 72 of the hydraulic clutch 62 through a tenth oil path 64, and this tenth oil path communicates at one end with a pressure sensor 68 through an eleventh oil path 66. This pressure sensor 68 can directly detect hydraulic pressure when a clutch pressure is controlled in a hold mode or in a start mode, and contributes when a command is implemented for making such detected hydraulic pressure a target clutch pressure. Also, as the clutch pressure becomes equal to the line pressure when in a drive mode, it contributes to the line pressure control.

The hydraulic clutch 62 comprises an input side casing 70 mounted on the rotational shaft 17, a clutch hydraulic chamber 72 formed within the casing 70, a piston 74 pushed rightwardly by hydraulic pressure acting in the clutch hydraulic chamber 72, an annular-type spring 76 for urging the piston 74 leftwardly, a first pressure plate 78 reciprocally movable by means of the pushing force of the piston 74 and the energizing force of the annular-type spring 76, an output side friction plate 80, and a second pressure plate 82 fixed to the casing 70.

In the hydraulic clutch 62, when a clutch pressure which is a hydraulic pressure acting on the clutch hydraulic chamber 72 is raised, the piston 74 is advanced rightwardly to cause the first and second pressure plates 78 and 82 to be intimately frictionally contacted with the friction plate 80 to form a so-called engaged state of the clutch. On the other hand, when the clutch pressure or hydraulic pressure acting on the clutch hydraulic chamber 72 is lowered, the piston 74 is withdrawn by means of the energizing force of the annular-type spring 76 to cause the first and second plates 78 and 82 to be separated from the friction plate 80 to form a so-called disengaged state of the clutch. In accord with such engagement and disengagement of the clutch, a driving force output by the continuously variable transmission 2 is interrupted and restored.

The first housing 18 has provided on an outside thereof an input shaft rotation detecting gear 84, and this input shaft rotation detecting gear 84 has its outer peripheral portion in the vicinity of an input shaft first rotation detector 86. The second housing 20 has provided on an outside thereof an output shaft rotation detecting gear 88, and this output shaft rotation detecting gear 88 has its outer peripheral portion in the vicinity of an output shaft second rotation detector 90. By detecting rotating speeds with the first and second rotation detectors B6 and 90, the engine speed and the belt ratio can be obtained.

Figure 2:
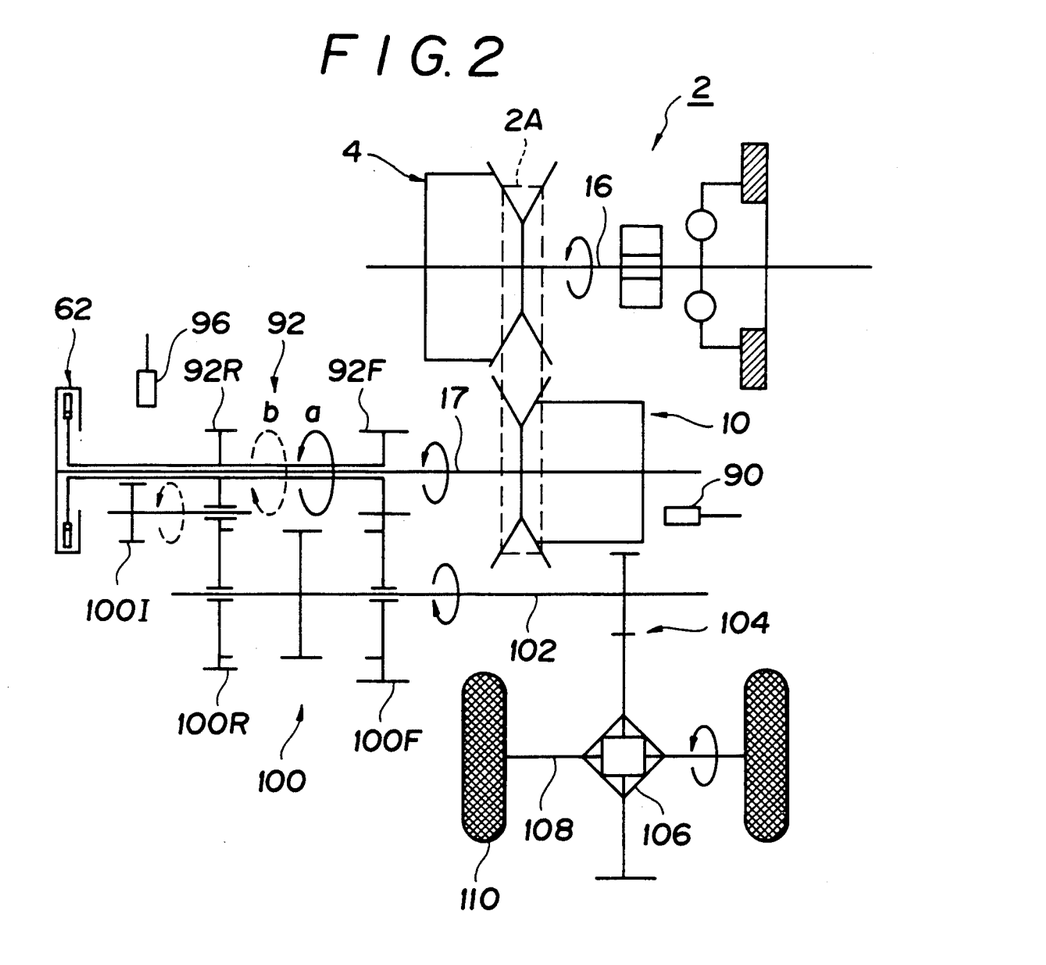
FIG. 2 is a diagrammatic view of a driving force transmitting system of a vehicle equipped with the continuously variable transmission of FIG. 1.

Furthermore, the hydraulic clutch 62 is provided with an output transmitting gear 92. This output transmitting gear 92 includes a forward output transmitting gear 92F and a reverse output transmitting gear 92R. The reverse output transmitting gear 92R has its outer peripheral portion in the vicinity of a third rotation detector 96 for detecting the rotating speed of a final output shaft 94. This third rotation detector 96, as shown in FIG. 2, is adapted to detect the rotating speed of the final output shaft 94, which drives a forward and reverse switching mechanism 100, an intermediate shaft 102, a final reduction gear 104, a differential mechanism 106, a driving shaft 108, and a vehicle wheel 110. Furthermore, by detecting rotating speeds with the second and third rotation detectors 90 and 96, there can also be detected the rotating speed of the input side and output side at the front and rear parts of the hydraulic clutch 62. This contributes to the detection of clutch slip amount.

There is provided an electronic microprocessor-based control unit 98 (FIG. 1) for performing a control by inputting various signals such as a carburetor throttle opening degree, a carburetor idle position, an accelerating pedal signal, a brake signal, a power mode option signal, a shift lever position, etc., in addition to signals coming from the pressure sensor 68 and the first through third rotation detectors 86, 90 and 96. The control unit 98 controls the opening and closing of the primary pressure controlling first three-way electromagnetic valve 42, the line pressure controlling second three-way electromagnetic valve 50, and the clutch pressure controlling third three-way electromagnetic valve 58, in order to control the belt ratio and the connected or disconnected state of the clutch based on the various input signals and in accord with various control modes.

The details of the function of the signals input into the control unit 98 are as follows;

(1) Shift lever position indicating signal

This signal contributes to control of line pressure and a belt ratio required for each range according to various signal states such as P, R, N, D, L, etc.

(2) Carburetor throttle opening degree indicating signal

This signal is used to calculate an engine torque from data in a memory loaded by a program beforehand and to determine a target ratio or a target engine speed.

(3) Carburetor idle state indicating signal

This signal is used to improve the accuracy of a correction of the carburetor opening degree and control.

(4) Accelerating pedal signal

This signal indicates the will of the driver in accord with a stepped-down degree of the accelerating pedal and is used to determine a control method for traveling or starting.

(5) Brake signal

This signal indicates whether the brake pedal is stepped-down on, and is used to determine a control direction such as disengagement of the clutch.

(6) Power mode option signal

This optional driver-controlled signal selects performance of the vehicle as sporty or economical.

The line pressure control valve 44 has a change gear control characteristic for performing control in three steps by effecting respective line pressures in a full low state, in a full overdrive state, and in a ratio fixed state.

The primary pressure control valve 34 for controlling a change gear controlling primary pressure is controlled in its action by the exclusive primary pressure controlling first three-way electromagnetic valve 42. This primary pressure controlling first three-way electromagnetic valve 42 is adapted to control the action of the primary pressure control valve 34 in order to connect the first oil path 30 to primary pressure or to the atmosphere. The primary pressure control valve 34 moves the belt ratio to full overdrive by supplying the line pressure into path 30 or to full low by connecting path 30 to the atmosphere.

The clutch pressure control valve 52 for controlling clutch pressure supplies line pressure to the tenth oil path 64 when the maximum clutch pressure is required, and connects path 64 to the atmosphere when minimum clutch pressure is required. This clutch pressure control valve 52, like the line pressure control valve 44 and the primary pressure control valve 34, is controlled in its action by the exclusive clutch pressure controlling third three-way electromagnetic valve 58. Therefore, a description of the operation of valve 58 will be omitted.

The clutch pressure can be changed within a range from a minimum or zero (atmospheric pressure) to a maximum (line pressure). There are four basic patterns for controlling clutch pressure, as follows:

(1) Neutral Mode

In the case where the clutch is to be completely disengaged because the shift position is N or P, the clutch pressure is set to the minimum pressure (zero).

(2) Hold Mode

In the case where there is no traveling will, wherein the throttle is separated when the shift position is D or R, or in the case where a speed reduction is desired during the traveling in order to cut off the engine torque, the clutch pressure is set to a low level such that the clutch is in contact.

(3) Start Mode (Special Start Mode)

At starting (normal start) or in the case where the clutch is to be engaged again (special start) after the clutch is disengaged, the clutch pressure is set to a proper level in accord with an engine generation torque (clutch input torque) for preventing a blow-up of the engine and for smoothly activating the vehicle.

(4) Drive Mode

In the case where the clutch is completely engaged after it goes to a complete traveling state, the clutch pressure is set to a sufficiently high level so that it can satisfactorily bear the engine torque.

The pattern (1) for Neutral Mode is effected by an exclusive switch valve (not shown) interlocked with the gear shifting operation. The remaining patterns (2), (3), and (4) are performed by changing duty ratios of control signals for the first through third three-way electromagnetic valves 42, 50 and 58 under control of the control unit 98. Particularly in the case of state (4), the seventh oil path 54 and the tenth oil path 64 communicate with each other through the clutch pressure control valve 52 to bring about a maximum clutch pressure state by bringing the clutch pressure to the same level as the line pressure.

The primary pressure control valve 34, the line pressure control valve 44, and the clutch pressure control valve 52 are controlled by output hydraulic pressure from the first through third three-way electromagnetic valves 42, 50, and 58, respectively. The control hydraulic pressure for controlling these first through third three-way electromagnetic valves 42, 50, and 58 is a constant control hydraulic pressure from the constant pressure control valve 38 through path 60. This control hydraulic pressure is always lower than the line pressure, and it is a stable constant pressure. Also, the control hydraulic pressure is introduced into the respective control valves 34, 44 and 52 to stabilize them.

The driving force output to the final output shaft 94 by changing the belt ratio and controlling the connected and disconnected state of the hydraulic clutch using the respective control valves 34, 44, and 52 is, as shown in FIG. 2, transmitted to the intermediate shaft 102 through the forward and reverse switching mechanism 100. The driving force of the intermediate shaft 102 is transmitted to the wheel 110 through the final speed reduction gear 104, the differential mechanism 106 and the driving shaft 108 to drive the vehicle (not shown) forward or backward. Also, the forward and reverse switching mechanism 100 comprises a forward switching gear 100F, a reverse switching gear 100R and an idler gear 100I. When the vehicle is traveling forward, the forward output transmitting gear 92F and the forward switching gear 100F are meshed with each other, and when the vehicle is traveling backward, the reverse output transmitting gear 92R and the reverse switching gear 100R are meshed with each other through the idler gear 100I.

Reference numeral 112 (FIG. 1) denotes an oil pan, and 114 an oil filter.

In such a continuously variable transmission 2, the control unit 98 is designed to control the clutch pressure using the clutch pressure control valve 52 so that the creep caused by slippage of the hydraulic clutch 62 in a hold mode when the continuously variable transmission 2 is in a reverse gear operation is larger than the creep caused by slippage of the hydraulic clutch 62 in a hold mode when the continuous variable transmission 2 is in a forward gear operation.

Next, a first embodiment of the present invention will be described with reference to FIGS. 3 and 4, in which:

NE: Engine speed of internal combustion engine
PCC: Target value of creep
FWD: Forward gear operation
REV: Reverse gear operation
PVCRV: NE-PCC map
PVCRV 1: NE-PCC map for forward gear operation
PVCRV 2: NE-PCC map for reverse gear operation
PCE: Clutch engage pressure
PCLU: Actual clutch pressure
PCLUSP: Target clutch pressure value
NPC: Clutch solenoid duty value
OPWCLU: Clutch solenoid duty value
CEGFLG: When this flag is set, the clutch is subjected to closed loop control.
HLD: When set, hold control mode is in effect when set to an "on" condition.
IDL UP: The engine's speed of revolving is increased It will be recognized as inherent to the operation of the disclosed apparatus that actual creep varies directly in response to variation of the actual level of clutch engagement, which in turn varies directly in response to variation of the actual clutch pressure. Thus, each target value PCC of creep corresponds directly to a respective specific level of clutch engagement and to a respective specific clutch pressure.

Figure 3:
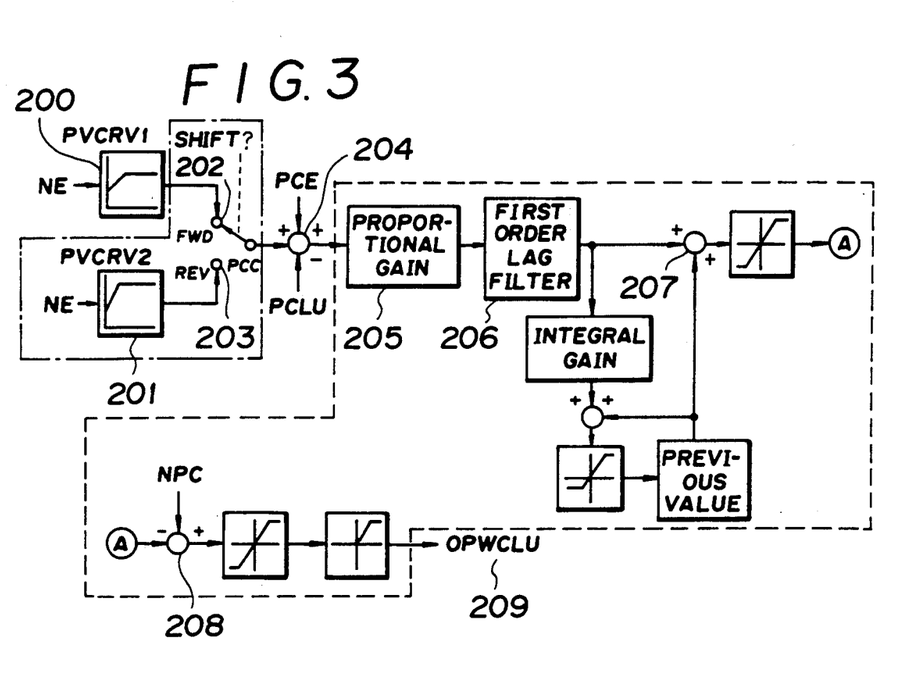
FIG. 3 is a block diagram of a control function for a first embodiment of the invention.

In the first embodiment, as shown in FIG. 3, there are provided PVCRV 1 for a forward gear shifting operation (200) and PVCRV 2 for a reverse gear shifting operation (201) to determine PCC from NE. In particular, PCC is determined from NE by PVCRV 1 for FWD (202), and PCC is determined from NE by PVCRV 2 for REV (203). The thus obtained PCC is added with PCE to make PCLUSP and a difference between this PCLUSP and PCLU is determined (204). PCE is a constant value. In order to eliminate this difference, the result from 204 is multiplied by a proportional gain (205), the result from 205 is subjected to a first order lag filter (206), the result from 206 is added to a previous value which has been subjected to an integral gain (207), and the result of 207 is added with NPC (208) to obtain OPWCL (209), which is used to control the clutch control valve 52 controlling the clutch pressure.

Those of ordinary skill in the art will recognize that, in a conventional manner, when the closed-loop control system shown diagrammatically in FIG. 3 is implemented in software in the microprocessor-based control unit 98, the program section which evaluates the control system in order to obtain the current output value OPWCLU is periodically executed while the transmission remains in the hold mode, in order to close the loop for purposes of the required closed-loop control so that the control unit iteratively adjusts OPWCLU as necessary to conform actual pressure (creep) to the target pressure (creep) and to thereafter maintain the actual value at the target value.

The controlling of this first embodiment will be described with reference to FIG. 4.

When control starts (300), it is judged (301) whether or not the hold mode is in effect. If it is judged as NO, the control is performed in accord with a program for the mode other than the hold mode.

If the judgment (301) is YES, the flag CEGFLG for effecting closed loop controlling of the clutch pressure by means of feed back is set (302), and it is judged (303) whether the gear operation is REV.

If the judgment (303) is NO because it is a forward gear operation, PCC is determined (304) from NE by PVCRV 1, and IDL UP is turned off (305). Then, this PCC is added with PCE to obtain PCLUSP (306) for the forward gear operation.

On the other hand, if the judgment (303) is YES because it is at reverse gear operation, PCC is determined (307) from NE by PVCRV 2, and IDL UP is turned on (308). Then, this PCC is added with PCE to obtain PCLUSP (306) for the reverse gear operation.

Figure 4:
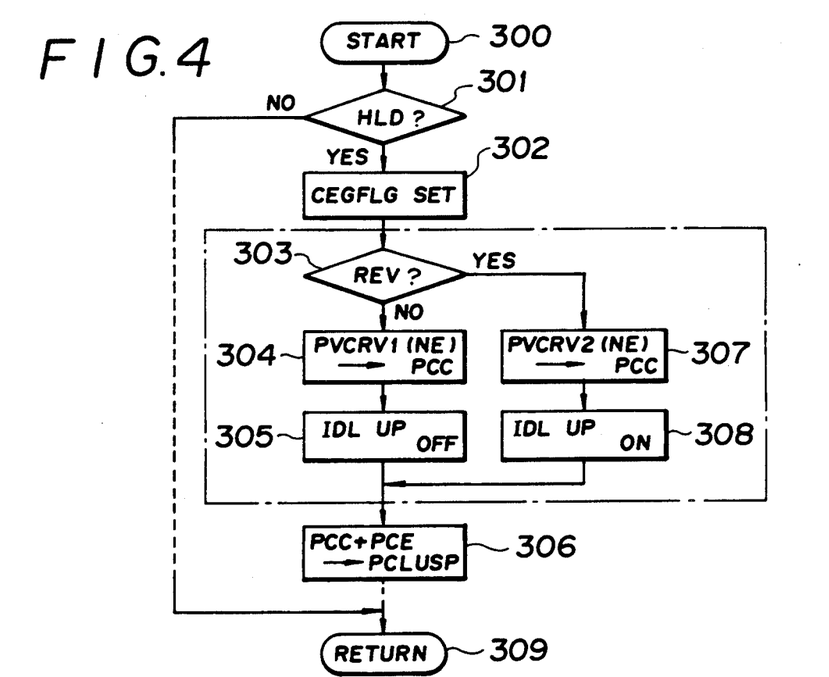
FIG. 4 is a flow chart of a program segment for part of the control function of FIG. 3.

The thus obtained PCLUSP for the forward gear operation or for the reverse gear operation is, as shown in FIG. 3, used (204) to find a difference with respect to PCLU, multiplied (205) by a proportional gain in order to eliminate this difference, then subjected (206) to a first order lag filter, then added (207) to a previous value which has been subjected to an integral gain, added (208) with NPC, and finally OPWCLU is obtained (209), which is used to control the clutch pressure by controlling the clutch pressure control valve 52, after which program control in FIG. 4 is returned (309).

In this way, according to the first embodiment, as PVCRV 1 is provided for a forward gear operation and PVCRV 2 for a reverse gear operation, creep for the forward driving of the vehicle and creep for the reverse driving of the vehicle can be separately established. Accordingly, by PVCRV 1 and PVCRV 2, the clutch pressure can be controlled so that creep for the reverse gear operation is larger than creep for the forward gear operation.

By this, a vehicle can utilize a larger creep for reverse driving than the creep for forward driving without the necessity of stepping down on the accelerating pedal, even when the creep for the forward driving of the vehicle is made small.

Owing to the foregoing, there can be avoided an occurrence of problems such as, for example, that a vehicle is moved or vibrations tend to be generated while the vehicle is stopped because of waiting for a traffic signal when in a forward gear operation. Therefore, driving performance is not jeopardized for the forward gear operation. Also, driving performance can be improved for the reverse gear operation by eliminating difficulty for reversing a vehicle caused by excessive reversing speed. Furthermore, as these problems can be overcome simply by changing software and without additional hardware, most of the conventional control program can be used. Therefore, increasing of the amount of memory of a control unit can be minimized and useless cost increase can be avoided, and thus the invention is economically advantageous. Moreover, as the device of the present invention can easily be applied to a conventional continuously variable transmission merely by changing a part of the program in the control unit, it is practically advantageous.

When creep becomes large, additional loads to the internal combustion engine are increased and increase vibration loads, thus inviting increased vibration. Therefore, by increasing the revolving speed of the idle by turning on IDL UP for REV where creep is large, vibrations which can accompany a large creep can be restrained.

Figure 5:
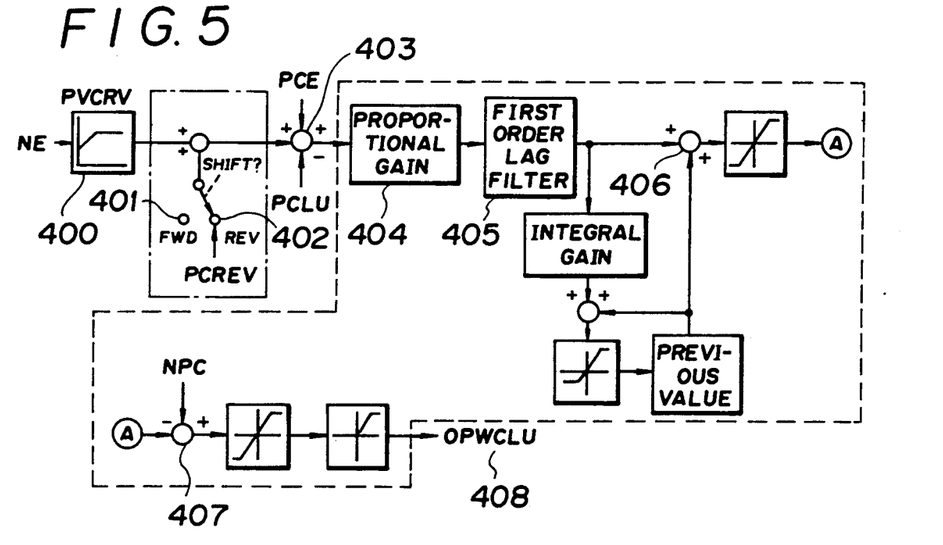
FIG. 5 is a block diagram of a control function for a second embodiment.
Figure 6:
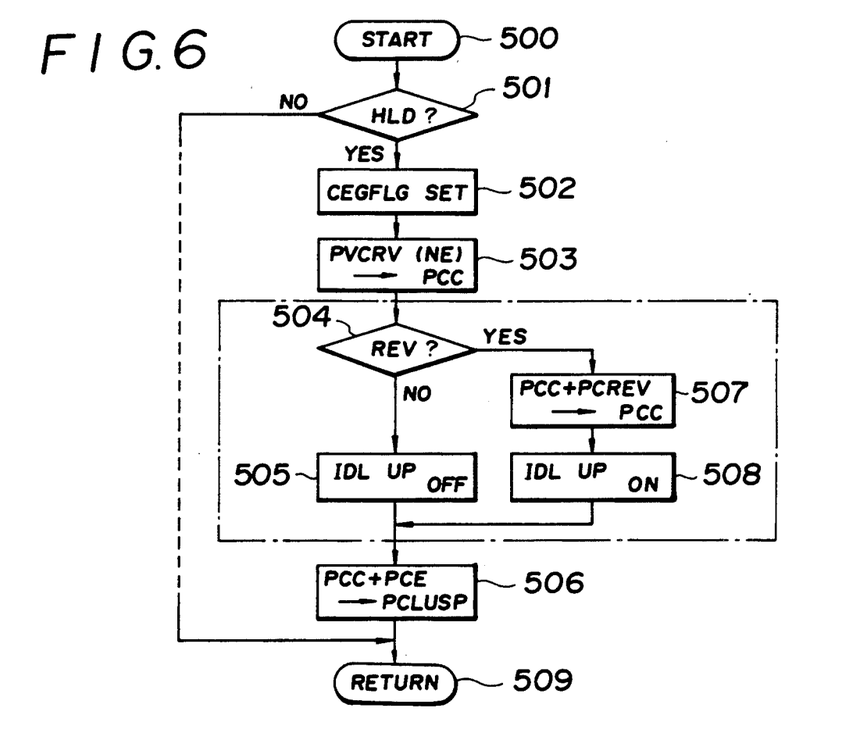
FIG. 6 is a flow chart of a program segment for part of the control function of FIG. 5.

FIGS. 5 and 6 show a second embodiment, in which:
NE: Engine speed of internal combustion engine
PCC: Target value of creep
FWD: Forward gear operation
PVCRV: NE-PCC map
PCE: Clutch engage pressure
PCLU: Actual clutch pressure
PCLUSP: Target clutch pressure value
PCREV: Correction value for engage pressure for reverse
NPC: Clutch solenoid duty value
OPWCLU: Clutch solenoid duty value
CEGFLG When this flag is set, the clutch is subjected to closed loop control.
HLD: When set, hold control mode is in effect
IDL UP: The engine's speed of revolving is increased when this is set to an "on" condition.

In this second embodiment, as shown in FIG. 5, there is provided a single PVCRV (400), and PCC is determined from NE using PVCRV for both FWD and REV (401). Thereafter, the thus obtained PCC is added to a constant PCREV in the case of REV to make PCC (402). Such PCC is added with PCE to make PCLUSP, and also the difference between PCLUSP and PCLU is determined (403). In order to eliminate this difference, the result from 403 is multiplied by a proportional gain (404), the result from 404 is subjected to a first order lag filter (405), the result of 405 is added to a previous value which has been subjected to an integral gain, and the result of 406 is added with NPC (407) to obtain OPWCL (408), which is used to control the clutch control valve 52 controlling the clutch pressure.

The control of this second embodiment will be described with reference to FIG. 6.

When control starts (500), it is judged (501) whether or not the hold mode is in effect. If it is judged as NO, control is performed in accordance with a program for the mode other than the hold mode.

If the judgment (501) is YES, CEGFLG is set to effect closed loop controlling of the clutch pressure by means of feed back (502), PCC is determined (503) from NE using PVCRV, and then it is judged (504) whether the gear operation is REV.

If the judgment (504) is NO because it is a forward gear operation, IDL UP is turned off (505). Then, the PCC which was determined in the aforementioned step 503 is added with PCE to obtain PCLUSP (506) for the forward gear operation.

On the other hand, if the judgment (504) is YES because it is a reverse gear operation, the PCC which was determined in the aforementioned step 503 is added with a constant PCREV to obtain PCLUSP (507), and then IDL UP is turned on (508). The thus obtained PCC is added with PCE to obtain PCLUSP (506) for the reverse gear operation.

The thus obtained PCLUSP for the forward gear operation or PCLUSP for the reverse gear operation is, as shown in FIG. 5, used at 403 to determined a difference with respect to PCLU. Then, in order to eliminate this difference, multiplied (404) by a proportional gain, then subjected (405) to a first order lag filter, then added (406) to a previous value which has been subjected to an integral gain, then added (407) with NPC, and finally OPWCLU is obtained (408) and is used to set the clutch pressure by controlling the clutch pressure control valve 52, after which program control in FIG. 6 is returned (509).

In this way, according to the second embodiment, since there is provided a single PVCRV and PCREV is used to make PCLUSP larger for the reverse gear operation ($=$PCC(NE)+PCREV+PCE) with respect to PCLUSP for the forward gear operation ($=$PCC (NE)+PCE), the clutch pressure can be controlled so that creep for the reverse gear operation is larger than creep for the forward gear operation.

By this, a vehicle can utilize a larger creep for reverse driving than the creep for forward driving without the necessity of stepping down on the accelerating pedal, even when the creep for the forward driving of the vehicle is made small.

Owing to the foregoing, there can be avoided an occurrence of problems such as, for example, that a vehicle is moved or vibrations tend to be generated while the vehicle is stopped because of waiting for a traffic signal when in a forward gear operation. Therefore, driving performance is not jeopardized for the forward gear operation. Also, driving performance can be improved for the reverse gear operation by eliminating difficulty for reversing a vehicle caused by excessive reversing speed. Furthermore, as PCLUSP for reverse gear shifting operation can be obtained by adding to the single PVCRV a constant PCREV, these problems can be solved by changing existing programs even less than required for the first embodiment. Moreover, as the approach of the second embodiment can be applied to the conventional continuously variable transmission more easily than the first embodiment, merely by changing a part of the program of a control unit, it is practically advantageous.

As described in the foregoing, according to the present invention a clutch pressure is controlled by a control arrangement such that creep caused by slippage of a hydraulic clutch in hold mode for a reverse gear operation of the continuously variable transmission is larger than creep caused by slippage of the hydraulic clutch in hold mode for a forward gear operation of the continuously variable transmission. Accordingly, a vehicle can utilize a larger creep for the reverse operation than for the forward operation without the necessity of stepping down on the accelerating pedal.

By virtue of the foregoing, there can be avoided an occurrence of problems such as, for example, that a vehicle is moved or vibrations tend to be generated while the vehicle is stopped waiting for a traffic signal when in a forward gear operation. Therefore, driving performance is not jeopardized for the forward gear operation. Also, driving performance can be improved for the reverse gear operation by eliminating difficulty during reverse movement of a vehicle caused by excessive reversing speed. Furthermore, as the approach of the present invention can easily be added to a conventional continuously variable transmission merely by changing a part of the program of a control unit, it is practically advantageous.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a continuously variable transmission having a fixed pulley piece and a movable pulley piece which is supported for movement toward and away from said fixed pulley piece, a width of a groove between said pulley pieces being increased or decreased in order to increase or decrease a radius of rotation of a belt looped around a driving side pulley and a driven side pulley which include said fixed and movable pulley pieces to thereby vary a comprises a hydraulic clutch which is/engaged and disengaged in response to changes in a clutch pressure in order to control a driving force output by said continuously variable transmission, and control means for feedback controlling said hydraulic clutch so that a continuous creep caused by slippage of said hydraulic clutch in a hold mode during a reverse gear operation of said continuously variable transmission is larger than a continuous creep caused by slippage of said hydraulic clutch in a hold mode during a forward gear operation of said continuously variable transmission.

2. A method of controlling a continuously variable transmission which is operable in forward and reverse drive modes, which operatively couples an engine and driving wheel of a vehicle, and which has a clutch with a selectively variable level of engagement, comprising the steps of: effecting feedback control of engagement of said clutch to maintain said clutch substantially at a first level of engagement for causing continuous creep when said transmission is in said forward drive mode, and effecting feedback control of engagement of said clutch to maintain said clutch substantially at a second level of engagement greater than said first level for causing a continuous creep when said transmission is in said reverse drive mode; wherein said transmission is operable in a plurality of different operational modes, including a hold mode; and wherein said steps of effecting feedback control to maintain engagement of said clutch substantially at said first and second levels of engagement are carried out when said transmission is respectively in said forward and reverse drive modes during said hold mode.

3. A method according to claim 2, including the steps of: providing a first table which associates a plurality of different engine speeds with respective forward target levels of clutch engagement, providing a second table which associates a plurality of different engine speeds with respective reverse target levels of clutch engagement, periodically selecting from said first table a forward target level of clutch engagement corresponding to a current speed of said engine, and periodically selecting from said second table a reverse target level of clutch engagement corresponding to said current speed of said engine, said forward and reverse target levels of clutch engagement respectively corresponding to said first and second levels of clutch engagement, said step of effecting feedback control being carried out by feedback controlling an actual level of engagement of said clutch toward a target level which is respectively said forward target level and said reverse target level when said transmission is respectively in said forward and reverse drive modes.

4. A method according to claim 2, including the steps of: providing a table which associates a plurality of different engine speeds with respective levels of clutch engagement, periodically selecting from said table a level of clutch engagement associated with a current speed of said engine, determining a target level of clutch engagement which in said forward drive mode is said level selected from said table and which in said reverse drive mode is said level selected from said table increased by a predetermined amount, and thereafter carrying out said step of effecting feedback control by feedback controlling an actual level of engagement of said clutch toward said target level of clutch engagement.

5. A method according to claim 2, including the step of causing said engine to idle at first and second speeds when said transmission is respectively in said forward and reverse drive modes, said second engine speed being greater than said first engine speed.

* * * * *

UNITED STATES PATENT AND TRADEMARK OFFICE
CERTIFICATE OF CORRECTION

PATENT NO. : 5 060 768
DATED : October 29, 1991
INVENTOR(S) : Yoshinori YAMASHITA et al It is certified that error appears in the above-identified patent and that said Letters Patent is hereby corrected as shown below:

On the title page, line 13 of the Abstract; change "and hydraulic" to ---the hydraulic---.

Column 11, line 50; change "a comprises" to ---a belt ratio, wherein the improvement comprises---.

Column 11, line 51; change "is/engaged" to ---is engaged---.

Column 12, line 8; change "causing continuous" to ---causing a continuous---.

Signed and Sealed this

Thirtieth Day of March, 1993

Attest:

STEPHEN G. KUNIN

*Attesting Officer*     *Acting Commissioner of Patents and Trademarks*